Dec. 16, 1952  G. L. DU ROSTU  2,621,674
OUTFLOW REGULATOR

Filed Feb. 28, 1949  2 SHEETS—SHEET 1

Inventor
G. Levesque du Rostu

Patented Dec. 16, 1952

2,621,674

UNITED STATES PATENT OFFICE 2,621,674

OUTFLOW REGULATOR

Georges Levesque Du Rostu, Paris, France

Application February 28, 1949, Serial No. 78,727
In France May 17, 1943

3 Claims. (Cl. 137—100)

The present invention relates to a device adapted automatically to control a flow of fluid and which is applicable to internal combustion engines.

Its principle consists primarily in the interposition in a pipe line of a regulator adapted to control the flow of fluid in accordance with the loss of head of the fluid passing through an orifice, the pressure prevailing ahead of said orifice acting upon one face of a piston while the pressure prevailing behind said orifice acts upon the opposite face of said piston. In use with an internal combustion engine the device is adapted to be affected by the air flow to the engine by the variable air pressure in the suction pipe acting upon a piston. The two said pistons are connected with a valve which controls the fuel supply.

More specifically, the force controlled by the fuel flow is opposed to the force controlled by the air flow, with the result that the system is in balance when the two forces are equal; under such conditions the fuel supply is in a definite ratio to the air supply, which ratio is governed by the ratio between the sectional areas of the fluid flow passages, the sectional areas of the pistons and the way in which the two pistons are interconnected. As soon as this balance ceases, the system is unbalanced, whereby the sectional area of the passageway through the fuel supply control valve is modified in such a manner that the balance is restored.

It is to be understood that such a regulator may be used to control the flow of fluid in dependency on variable flows other than flow of air supplied to an internal combustion engine.

One of the main features of my device is that it is not affected by the pressure of the fluid supplied thereto, the flow of which is to be controlled.

In a particular embodiment of my invention the piston upon which the fluid flow force is applied is connected with a lever keyed on one end of a rock shaft. On the other end of said shaft a second lever is secured on which second lever a variable force, for controlling the fluid flow, is exerted. The rock shaft is mounted in a bore in a wall of a receptacle which contains the fluid. That end of the rock shaft which carries the lever subjected to the force set up by the piston is located within the said receptacle while the opposite end is located outside the same.

The fit of said shaft in said bore is such that frictionless rocking is provided while leakage of the fluid is prevented. This pivoting shaft is formed with a hollow axial portion having one end open and emerging in the first chamber as well as a transverse channel communicating with the discharge orifice, the pivotal motion of said shaft in said bore causing the fluid discharge outflow to vary through the displacement of the outlet aperture of the channel in relation to the bore channel aperture.

Variations in the pressure of the fluid the flow of which is controlled will not affect the force which tends to rock the shaft. The said pressure is exerted coaxially of the shaft. A feature of my invention resides in the fact that the said pressure is balanced by the reaction of a bearing arranged coaxially of the shaft, so that no disturbing axial movement occurs.

The action of the pressure upon the rock shaft may also be prevented by so mounting the shaft that it extends through the receptacle under pressure and that both ends thereof project to the outside of said receptacle.

The flow is controlled by the position of balance of the structure connected to the rock shaft whereby any angular displacement of the latter varies the dimension of an orifice upon which the flow is dependent.

According to a particular feature of my invention the variable orifice is provided advantageously in the following manner: The rock shaft is bored over a portion of its length and has a transverse port, so that the fluid under pressure is led through said port to a second transversal port directed at right angles to the cylindrical surface of said rock shaft. Depending on the angular position of the rock shaft either port is offset more or less with respect to the other, whereby the sectional area of the passageway formed by said ports for the fluid under pressure is modified.

It is also possible to vary the flow of fluid by creating a variable loss of head dealing with either the whole of the fluid flow or only with a fraction thereof.

My invention will be more fully understood by the following description of a preferred embodiment of the same, in which reference is had to the drawing appended hereto, wherein.

Figure 1:
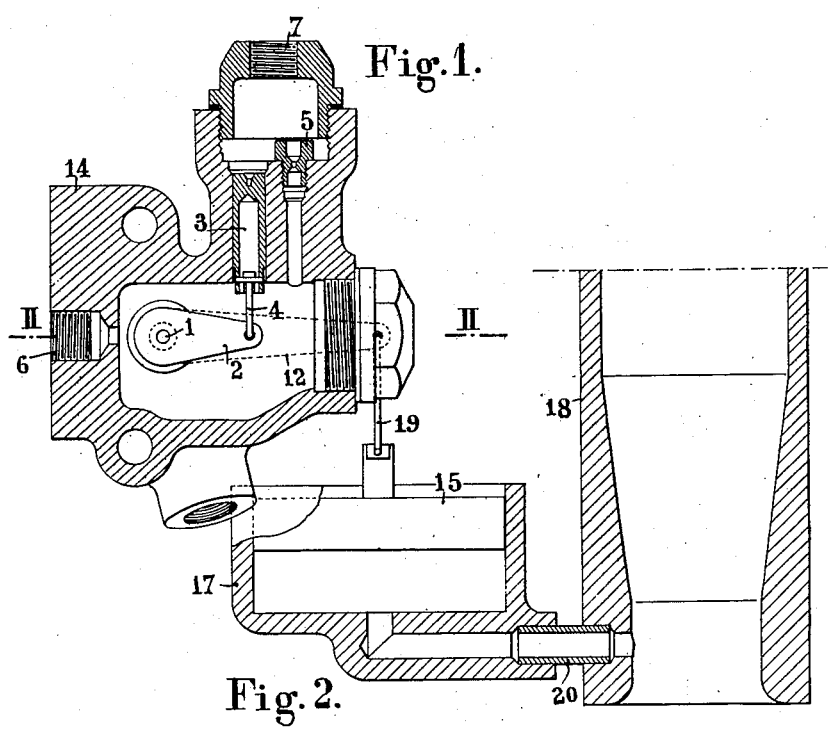
Figure 1 is a sectional view of the regulator.

The fluid, the flow of which is to be controlled, enters the casing 14 through inlet 6 and is discharged through outlet 7. The excess fluid is discharged through outlet 13.

Journaled in said casing 14 is a rock shaft 1 on one end of which a lever 2 is mounted to the free end of which a link 4 is pivoted and connected to a piston 3. The fluid flows through a calibrated orifice 5. A force is thus exerted upon the piston 3 which is proportional to the loss of head through 5.

Secured to the opposite end of the rock shaft 1 is a lever 12 to which a force representative of the flow of fluid is applied.

The pressure exerted by the fluid upon one end of the rock shaft 1 is offset by the reaction of bearing 11 against a cone-shaped member 10 in the other end of said shaft the bearing point of which is coaxial with the rock shaft 1, with the result that no disturbing axial movement occurs.

The rock shaft 1 is bored over part of its length and drilled with a transverse port 8 located opposite a transverse port 9 in the bore of casing 14 in which said shaft 1 is received.

The operation is as follows:

The fluid is delivered to casing 14 by a pump designed to force an excess amount of fluid. If too much of the fluid is forced out through 7 the force set up by the loss of head through the orifice 5 becomes higher than the force exerted upon the lever 12 and intended to control the flow. As a consequence, the movable system will be rocked in the direction imposed thereupon by the force exerted upon the piston 3. The ports 8 and 9 are so located that the resulting displacement will increase the sectional area of the passageway left free through the overlapping orifices. The said rocking movement will go on until the relief outflow through outlet 13 has become large enough to bring the flow through the calibrated orifice 5 into correspondence with the force exerted upon lever 12. Thenceforth balance will be obtained and every variation of one of the factors will result in such a variation in the position of the mechanism that balance is restored. In this manner, any variation in the force exerted upon the lever 12 will result in a corresponding variation in the flow through the outlet 7.

Of course, it is possible to feed a fluid under a fixed pressure through the regulator and to control the flow by means of orifices substituted for orifices 8 and 9 and adapted to set up a variable loss of head that will result in a modification of the flow. In this case the flow through the fluid supply system should decrease in proportion as the pressure therein increases.

In contrast thereto, in the device described hereinbefore, the flow through the supply system can be substantially independent of the pressure.

Figure 2:
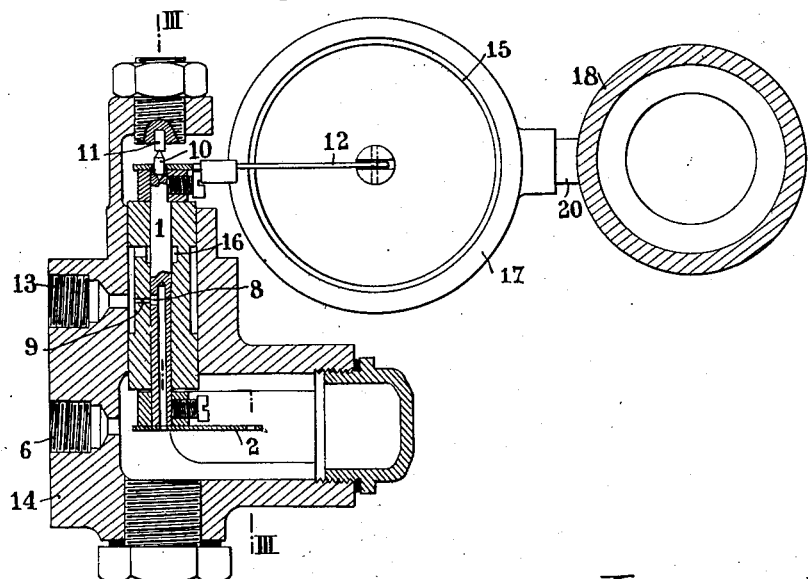
Figure 2 is a further sectional view of the same taken on line II—II of Fig. 1.
Figure 3:
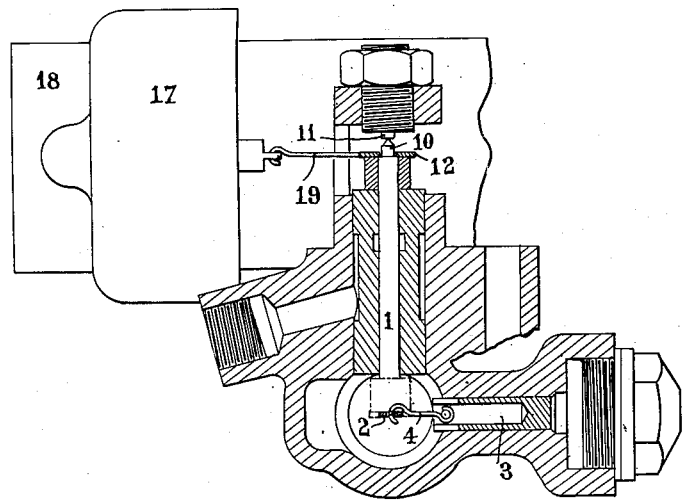
Fig. 3 is another sectional view according to the line III—III of Fig. 2.

As shown in Figs. 1 and 2 the fluid under pressure is contained within the chamber formed by the walls of the regulator. The only possible source of leakage lies in the play of the rock shaft in its housing. If desired, the possibility of some leakage down to a groove 16 from which the fluid can be recovered may be provided.

Finally, where the fluid under pressure is the fuel supplied to an internal combustion engine, the fuel supply can be controlled by the air supply to the engine by means of a piston 15 in a cylinder 17 which is connected by a channel 20 to a pipe 18. The air sucked in by the engine flows through pipe 18 and changes the position of piston 15 which is connected by a rod 19 to the lever 12.

What I claim as my invention and desire to secure by Letters Patent is:

1. In a valve for controlling the flow of a fluid under pressure, the combination of a body having two chambers; means for introducing the fluid into one of said chambers; means for discharging the fluid from the other of said chambers; a conduit connecting said chambers and having a calibrated orifice therein, said body having a bore connecting said chambers; a piston reciprocable in said bore, responsive to fluid pressures in the chambers, respectively; a rock shaft journaled in said body and having a conduit communicating with said chamber into which the fluid is introduced, said body having a conduit adapted to discharge from said body the fluid from the conduit in the shaft; and means for rocking said shaft, actuated by reciprocation of said piston, the disposition of said rock shaft determining the relation of the conduit in the shaft and the conduit in the body to control the discharge of the fluid through the body and shaft conduits.

2. In a valve for controlling the flow of a fluid under pressure, the combination of a body having two chambers; means for introducing the fluid into one of said chambers; means for discharging the fluid from the other of said chambers; a conduit connecting said chambers and having a calibrated orifice therein, said body having a bore connecting said chambers; a piston reciprocable in said bore, responsive to fluid pressures in the chambers, respectively; a rock shaft journaled in said body and having a conduit communicating with said chamber into which the fluid is introduced, said body having a conduit adapted to discharge from said body the fluid from the conduit in the rock shaft; and a lever on one end of the said shaft for rocking said shaft, said lever being connected to said piston, the disposition of said piston determining the relation of the conduit in the shaft and the conduit in the body to control the discharge of the fluid through the body and shaft conduits.

3. In a valve for controlling the flow of a fluid under pressure, the combination of a body having two chambers; means for introducing the fluid into one of said chambers; means for discharging the fluid from the other of said chambers; a conduit connecting said chambers and having a calibrated orifice therein, said body having a bore connecting said chambers; a piston reciprocable in said bore, responsive to fluid pressures in the chambers, respectively; a rock shaft journaled in said body and having a conduit communicating with said chamber into which the fluid is introduced, said body having a conduit adapted to discharge from said body the fluid from the conduit in the rock shaft; a lever on one end of said shaft for rocking said shaft, said lever being connected to said piston, the disposition of said shaft determining the relation of the conduit in the shaft and the conduit in the body to control the discharge of the fluid through the body and shaft conduits; a second lever on the other end of said shaft for rocking said shaft; a second piston connected to said second lever and adapted to be reciprocated by a variable flow of air, for rocking said shaft.

GEORGES LEVESQUE DU ROSTU.

REFERENCES CITED

The following references are of record in the file of this patent:

UNITED STATES PATENTS

| Number | Name | Date |
| --- | --- | --- |
| 1,363,513 | Kieth | Dec. 28, 1920 |
| 2,004,869 | Hogg | June 11, 1935 |
| 2,212,374 | Louis | Aug. 20, 1940 |
| 2,570,557 | Johnson | Oct. 9, 1951 |